(12) United States Patent
　　　Yuksel et al.

(10) Patent No.: US 9,634,922 B2
(45) Date of Patent: Apr. 25, 2017

(54) APPARATUS, SYSTEM, AND METHOD FOR CLOUD-ASSISTED ROUTING

(71) Applicant: BOARD OF REGENTS OF THE NEVADA SYSTEM OF HIGHER EDUCATION, ON BEHALF OF THE UNIVERSITY OF NEVADA, RENO, Reno, NV (US)

(72) Inventors: Murat Yuksel, Reno, NV (US); Tarik Karaoglu, Sunnyvale, CA (US)

(73) Assignee: BOARD OF REGENTS OF THE NEVADA SYSTEM OF HIGHER EDUCATION, ON BEHALF OF THE UNIVERSITY OF NEVADA, RENO, Reno, NV (US)

( * ) Notice: Subject to any disclaimer, the term of this patent is extended or adjusted under 35 U.S.C. 154(b) by 554 days.

(21) Appl. No.: 14/024,524

(22) Filed: Sep. 11, 2013

(65) Prior Publication Data
US 2014/0075048 A1　Mar. 13, 2014

Related U.S. Application Data

(60) Provisional application No. 61/699,413, filed on Sep. 11, 2012.

(51) Int. Cl.
| | |
|---|---|
| *G06F 15/173* | (2006.01) |
| *H04L 12/751* | (2013.01) |
| *H04L 12/703* | (2013.01) |
| *H04L 29/08* | (2006.01) |

(52) U.S. Cl.
CPC ............ *H04L 45/02* (2013.01); *H04L 45/025* (2013.01); *H04L 45/28* (2013.01); *H04L 67/2814* (2013.01); *H04L 67/1097* (2013.01)

(58) Field of Classification Search
CPC ....... H04L 45/02; H04L 45/025; H04L 45/28; H04L 67/2814; H04L 67/1097
See application file for complete search history.

(56) References Cited

U.S. PATENT DOCUMENTS

| | | | | |
|---|---|---|---|---|
| 6,567,380 | B1 * | 5/2003 | Chen ...................... | H04L 45/02 370/238 |
| 2004/0054807 | A1 * | 3/2004 | Harvey ................... | H04L 12/56 709/243 |
| 2005/0163080 | A1 * | 7/2005 | Suh ................... | H04W 36/0016 370/331 |

(Continued)

OTHER PUBLICATIONS

Chen et al., "Outbound route filtering capability for BGP-4," RFC 5291, Aug. 2008.

(Continued)

*Primary Examiner* — Jonathan Bui
(74) *Attorney, Agent, or Firm* — Schwabe Williamson & Wyatt, P.C.

(57) ABSTRACT

Among other aspects, the present disclosure provides a computer implemented method of routing information. A first routing information base is received at a proxy router. The first proxy router compares the first routing information based with a second routing information base associated with an assisted router. The proxy router updates the second routing information base based on the first routing information base. The proxy routing transmits updated routing information to the assisted router.

18 Claims, 6 Drawing Sheets

(56) References Cited

U.S. PATENT DOCUMENTS

| | | | | |
|---|---|---|---|---|
| 2007/0165543 A1* | 7/2007 | Joo | ............. | H04L 45/02 370/254 |
| 2008/0247393 A1* | 10/2008 | Ong | ............. | H04L 45/00 370/392 |
| 2010/0080234 A1* | 4/2010 | Borkenhagen | ............. | H04L 45/02 370/395.31 |
| 2011/0085442 A1* | 4/2011 | Lin | ............. | H04L 45/42 370/235 |
| 2011/0170448 A1* | 7/2011 | Buob | ............. | H04L 12/24 370/252 |
| 2012/0147884 A1* | 6/2012 | Yoon | ............. | H04L 45/02 370/389 |
| 2013/0070753 A1* | 3/2013 | Sahni | ............. | H04L 45/021 370/351 |

OTHER PUBLICATIONS

Karpilovsky et al., "Using forgetful routing to control BGP table size," *Proc. of ACM CoNEXT*, pp. 2:1-2:12, 2006.

* cited by examiner

Table 1: EMULAB Experiment Setup

| Dataset | Peers | RIB Prefix | Route Per Prefix | Updates (per min) | Traffic (kbps) | Primary Prefix | D1 (msec) | D2 (msec) |
|---|---|---|---|---|---|---|---|---|
| ISC-EQUIX | 16/17 | 381,455 | 1.84 | 2,664 | 435,200 | 654 | 146,870 | 28,161 |
| AMSIX-NYIIX | 10/11 | 384,180 | 1.82 | 3,523 | 281,600 | 2,897 | 141,316 | 28,529 |
| LINX-DECIX | 13/14 | 390,088 | 1.82 | 3,332 | 358,400 | 1,105 | 156,799 | 28,633 |

APPARATUS, SYSTEM, AND METHOD FOR CLOUD-ASSISTED ROUTING

CROSS REFERENCE TO RELATED APPLICATION

This application claims the benefit of, and incorporates by reference, Provisional Patent Application Ser. No. 61/699,413, filed Sep. 11, 2012.

SUMMARY

In one embodiment, the present disclosure provides a computer implemented method of routing information, such as internet traffic. An assisted router, such as a hardware based router, determines whether a piece of information includes routing information that meets assisted router routing criteria. For example, assisted router routing criteria can include whether the assisted router includes sufficient path information to forward the information to a destination. If the assisted router routing criteria are met, the assisted router processes the piece of information, such as forwarding it towards a destination. If the assisted router routing criteria are not met, the assisted router seeks assistance from a proxy router, such as a cloud based proxy router. In one example, assistance includes forwarding the information to the proxy router. In a particular example, the proxy router then forwards the piece of information. In another example, assistance includes querying the proxy router for information needed to process, such as forward, the piece of information. Once the assisted router receives the needed forwarding information, it can forward the piece of information.

In one implementation of the embodiment, the assisted router comprises a partial forwarding table. For example, the assisted router may include a list of heavily used prefixes. In another implementation of the embodiment, the proxy router, such as a cloud based proxy router, comprises a full forwarding table.

According to another implementation, at least a portion of computationally intensive processes are carried out by the proxy router rather than the assisted router. In various examples, the proxy router performs one or more of calculating forwarding tables, performing BGP table exchanges, performing full fledged shortest path calculations, and performing traffic engineering operations. In another example, the assisted router maps ghost configurations received from the proxy router to lower level networking functions.

In another implementation, the assisted router is a first assisted router. In one aspect, the first assisted router transmits a signal to a second assisted router indicating that the first assisted router includes a first proxy router, the first proxy router being the proxy router. In another aspect, the second assisted router queries whether the first assisted is associated with a proxy router. Peer exchanges may be authorized between the first proxy router and the second assisted router. The proxy router determines whether any changes resulting from peer exchange are priority or nonpriority changes. In one example, priority changes are prioritized for transmission to the assisted router, such upon request of the assisted router.

According to another embodiment of the present disclosure, a first routing information base is received at a proxy router. At the proxy router, the first routing information base is compared to a second routing information base. The second routing information base is associated with an assisted router. The second routing information base is updated at the proxy router. Updated routing information is transmitted to the assisted router. In some examples, the proxy router provides routing assistance, such as performing routing information base comparisons or updates, to two or more assisted routers.

In a particular implementation, transmitting updated routing information to the assisted router includes, potentially exclusively, at least at a first time period, transmitting priority changes in routing and forwarding states to the assisted router. In particular examples, nonpriority changes in routing and forwarding states are transmitted to the assisted at a second time. In some aspects, the transmission of priority or nonpriority changes is initiated upon request of the assisted router.

In another implementation, the first assisted router receives a capability exchange request from a second assisted router. The second assisted router is notified that the first assisted router is associated with the proxy router. The proxy router receives a request associated with the second assisted router to exchange routing information associated with the first assisted router.

In yet another embodiment of the present disclosure, control plane computations are performed at a proxy router, such as a cloud based proxy router, providing routing assistance to an assisted router, such as a hardware router. Updated routing information is transmitted from the proxy router to the assisted router. In a particular implementation, priority changes in routing and forwarding states are transmitted to the assisted router at a first time. Nonpriority changes may be transmitted to the assisted router at a second time. In particular examples, the transmission of priority or nonpriority changes is initiated in response to a request from the assisted router.

In another embodiment, of the present disclosure a first assisted router requests updated routing information from a proxy router. The first assisted router receives updated routing information from the proxy router. Data is forwarded from the first assisted router to a second assisted router based on the updated routing information. In a particular implementation, the first assisted router requests priority changes in routing and forwarding states from the proxy router.

In another implementation, the first assisted router receives a capability exchange request from a third assisted router. The first assisted router transmits to the third assisted router that the first assisted router is associated with the proxy router.

In another embodiment, the present disclosure provides a cloud assisted router that includes a hardware router in communication with a cloud based proxy server.

The above described methods, and others described elsewhere in the present disclosure, may be computer implemented methods, such as being implemented in computing devices that include memory and a processing unit. The methods may be further embodied in computer readable medium, including tangible computer readable medium that includes computer executable instructions for carrying out the methods. In further embodiments, the methods are embodied in tools that are part of system that includes a processing unit and memory accessible to the processing unit. The methods can also implemented in computer program products tangibly embodied in a non-transitory computer readable storage medium that includes instructions to carry out the method.

Certain aspects of the present disclosure are described in the appended claims. There are additional features and advantages of the various embodiments of the present disclosure. They will become evident from the following disclosure.

In this regard, it is to be understood that the claims form a brief summary of the various embodiments described herein. Any given embodiment of the present disclosure need not provide all features noted above, nor must it solve all problems or address all issues in the prior art noted above or elsewhere in this disclosure.

BRIEF DESCRIPTION OF THE DRAWINGS

Various embodiments are shown and described in connection with the following drawings in which.

DETAILED DESCRIPTION

Figure 1:
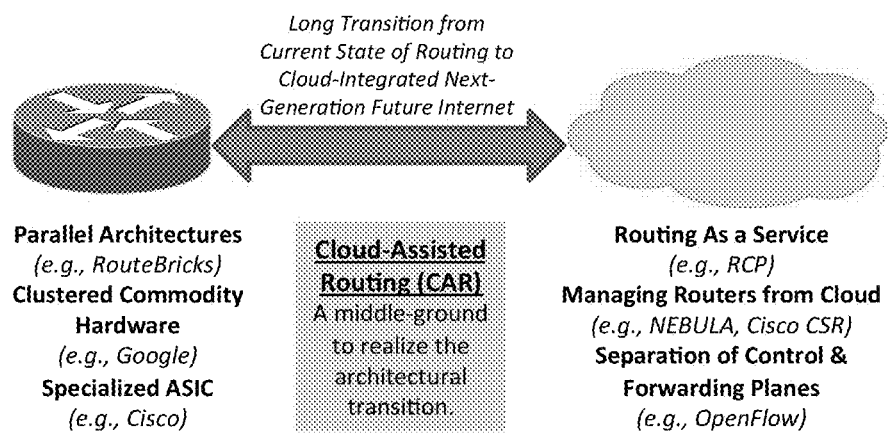
FIG. 1 is a schematic diagram illustrating the architectural transition and integration of proxy router assisted routing services, such as cloud services, to routers.

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. Although methods and materials similar or equivalent to those described herein can be used in the practice or testing of the present disclosure, suitable methods and materials are described herein. The disclosed materials, methods, and examples are illustrative only and not intended to be limiting.

The present disclosures provides a new architectural approach, Proxy Router-Assisted Routing, that uses the computing resources of a proxy router to provide routing assistance to an assisted router. In a particular example, the assisted router is a hardware router, such as a router having hardware-implemented routing functions. In a more particular example, the hardware router also includes software based routing functions. In other examples, the assisted router has software implemented routing functions, including software implemented routing functions combined with real or virtual hardware functions. An assisted router can be (or include one or more of), in various implementations, a single device having a single processor, a single device having multiple processors, one of a collection of devices having single or multiple processors, a collection of devices functioning as a distributed, parallel, or concurrent computing environment, or virtualized computing environments, such as cloud computing. In a specific example, the assisted router is a hardware router implemented in a single physical device.

Routing assistance can include, for example, assistance with data plane and/or control plane functions. For example, the proxy server can be contacted by the hardware router for assistance in determining how to process, such as forward, information. In another example, the hardware router can send information to the proxy router for disposition, such as forwarding, by the proxy router. In a specific implementation, the proxy router implements full routing functions/capabilities, such as full data plane and control plane functionality, and the hardware router implements partial routing functions/capabilities, such as partial data plane and/or control plane functionality.

A proxy router is any device or collection of devices that provides proxy router services to a hardware router. A proxy router can be (or include one or more of), in various implementations, a single device having a single processor, a single device having multiple processors, one of a collection of devices having single or multiple processors, a collection of devices functioning as a distributed, parallel, or concurrent computing environment, or virtualized computing environments, such as cloud computing.

In a particular implementation, the present disclosure provides an approach called Cloud-Assisted Routing (CAR), that leverages high computation and memory power of cloud services for easing complex routing functions such as forwarding and flow level policy management. Implementations of the present disclosure can mitigate the increasing routing complexity to the cloud ion. The present disclosure describes how to integrate cloud computing with routers and define operational regions where such integration is beneficial. Although the remaining discussion focuses on a specific subset of Proxy Router-Assisted Routing Cloud-Assisted-Routing using a hardware router as the assisted router, unless the context clearly prevents such interpretation, it is to be understood that the discussion applies equally to Proxy Router-Assisted Routing, in general, and the various possible implementations thereof. Those of ordinary skill in the art will understand how to set up other Proxy Router-Assisted Routing systems using concepts analogous to CAR unless no such analogous concept exists.

Concerns over routing scalability has increased recently. Currently, there are more than 30,000 service providers advertising more than 350,000 IP prefixes, with a typical edge router receiving hundreds of updates per second. Further, BGP churn can grow prohibitively if topology growth and update dampening are not performed carefully. These concerns become more serious as the Internet topology is becoming more flat, putting more burden on the core routers. Multi-homing and peering practices as well as the demand on more routing flexibility (e.g., multi-path routing, QoS routing) have been contributing to the routing complexity issues the Inter-net faces. Operators rightfully expect more router programmability, which further challenges router architectures by inclusion of software-based designs and virtualization of routing as a service.

As the complexity on the routers increased, the cost of a router became non-trivial. The cost of routing unit traffic has not been reducing at a pace similar to the performance improvement of computing capabilities of a router. Given the trends on the state and packet processing capacities expected from a BGP router, the cost of a router that can perform the basic routing functions at the Internet core is unlikely to reduce. These trends point to the urgent need for techniques and architectural approaches reducing or offloading complexities on the routers. The present disclosure mitigates the increasing routing complexity to the cloud by leveraging the memory and computation resources of the cloud to remedy the routing scalability issues.

To address the alarming increase in routing complexity, particularly at the inter-domain level, the present disclosures introduces a new architectural approach, Cloud-Assisted Routing (CAR). A framework is provided on how to integrate cloud computing with routers and define operational regions where such integration is beneficial. As indicated in FIG. 1, a novel property of CAR is its aim to find a middle-ground between a pure local approach that targets to scale router performance (e.g., RouteBricks) and a completely cloud-based approach for seamless and highly flexible routing services (e.g., CSR).

As the cloud is getting "closer" to router hardware via availability of more sites providing cloud services, it becomes possible to make pragmatic comparisons among cloud providers and select the best one fitting to one's particular needs. The latency to the closest cloud provider and response time on various types of computation and storage tasks can be at sub-second levels. In this context, using cloud services to relieve routers' complex duties is advantageous. Such integration of cloud services to router platforms also enables intra- and inter-domain optimizations by exploiting the "central" role of the cloud.

Figure 2:
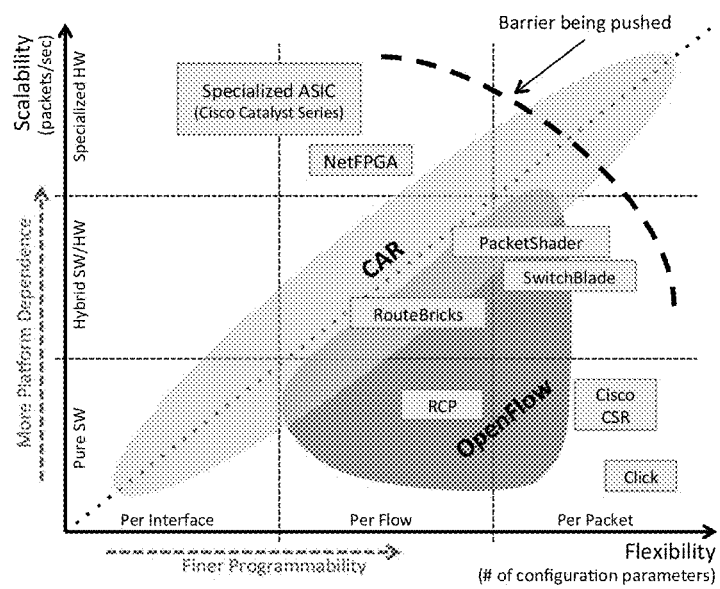
FIG. 2 is a graph of platform dependence versus programmability illustrating the scalability-flexibility tradeoff for routing.

Though moving networking functionalities to the cloud may provide some benefit, delegating all routing functions to the cloud may expose routing services to potential cascading failures. A hybrid approach that maintains high priority tasks at the router and employs an adaptive cloud-router integration framework can address both routing scalability and flexibility, as shown in FIG. 2. In that sense, CAR follows an opportunistic model, where routers exploit cloud resources whenever they are available and beneficial. Such hybrid approach with partial dependence on the cloud resources allows routers to quickly re-take responsibility of delegated tasks in case of cloud-related connectivity or performance problems.

Figure 3:
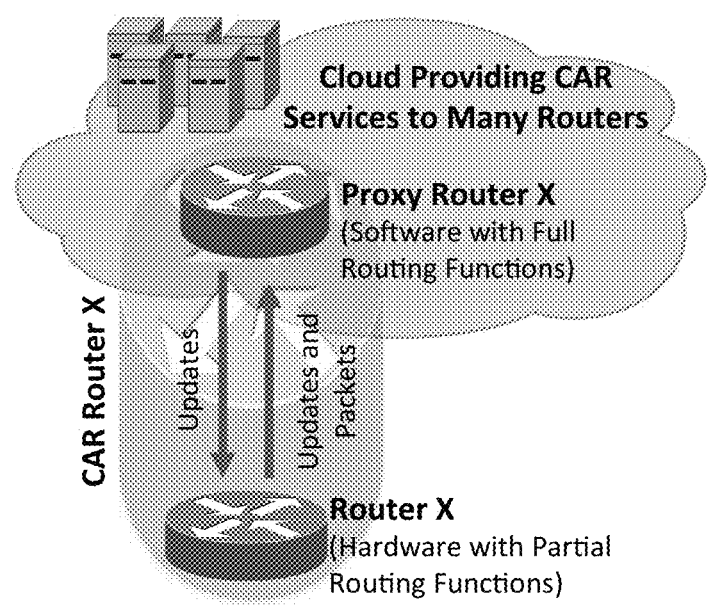
FIG. 3 is a schematic diagram illustrating an architectural view of proxy router-assisted routing, such as cloud assisted routing.

An architectural view of CAR includes a legacy hardware router with partial routing functions and a software router with full routing functions, which together establish a hybrid "CAR Router" as illustrated in FIG. 3. Similar to how virtual memory systems use secondary storage to maintain the full content of the memory, CAR uses the cloud to implement the full functionality of a Router X, and keeps Router X as 'active' while Proxy Router X as 'passive'. The software Proxy Router X holds the full forwarding tables; and is the default point of service for data and control plane functions that can-not be handled at the hardware Router X. Some of the control plane operations such as on-demand route computations due to failures may still be triggered by the hardware Router X. However, CAR will host heavy routing optimizations at the Proxy Router X.

CAR's approach to scaling computational complexity of routing is to delegate control plane functions to the cloud to the extent possible. This approach allows routing to be scaled via the cloud's speed up by parallelism. As opposed to just exploiting parallelism in routing by modularizing a router into many parallel working nodes, cloud computing offers extensible resources beyond what can be offered locally. Further, many routing problems require on-demand, large-scale computations (e.g., traffic engineering and calculating backup paths) which naturally fit to the CAR's approach of having an active hardware router.

Currently, data plane is under a heavy strain of high demand on increasing data rates and more flexible management. Commercial routers provide scalable data plane with highly optimized packet forwarding circuits, implementing forwarding operations in extremely fast ASIC circuits and forwarding tables in custom TCAM memories. CAR's approach is to opportunistically use the Proxy Router X at the cloud to calculate the forwarding tables. In CAR, packet classification, flow descriptions and corresponding forwarding actions (e.g., traffic shaping, Diff-Serv mechanisms, packet filtering, provisioning) are all defined as "movable states" computed by control plane. The actual Router X is responsible for mapping of these ghost configurations to lower level networking resources such as physical interface addresses, layer 2 configurations, GRE tunnels, and other virtualized resources.

Following the Amdahl's Law, CAR treats the router hardware as a precious resource and thus focuses on the most frequent or important routing functions in the router and offloads the rest to the cloud. Particularly, the following two principles are generally followed when applying CAR to a routing problem:

CPU Principle: Keep Control Plane Closer to the Cloud. CAR designer should offload heavy computations to the cloud as much as possible. Example of such heavy but not-so-urgent control plane computations include BGP table exchanges, full-fledged shortest-path calculations, and various traffic engineering optimizations.

Memory Principle: Keep Data Plane Closer to the Router. CAR designer should keep the packet forwarding operations in the router to the extent possible. An example conformation to the memory principle is to handle most of the forwarding lookups by maintaining a copy of heavily used prefixes at the router memory and delegate the rest of the lookups to the cloud where the complete set of prefixes is held.

BGP Forwarding Table Size. An issue with core BGP routers is their forwarding table (FIB) and routing table (RIB) sizes. Several studies observed temporal (bursts of packets in the same flows) and spatial (few popular destinations) locality in data packet traffic. This means that even though most of the destinations will be looked up very infrequently, they will keep occupying the routing table. Likewise, even though most of the updates and routing table entries will be needed very infrequently, router CPU(s) will be consumed for those updates and entries. CAR leverages these locality patterns and delegates the less used majority to the cloud while keeping the more used minority at the router.

Figure 4:
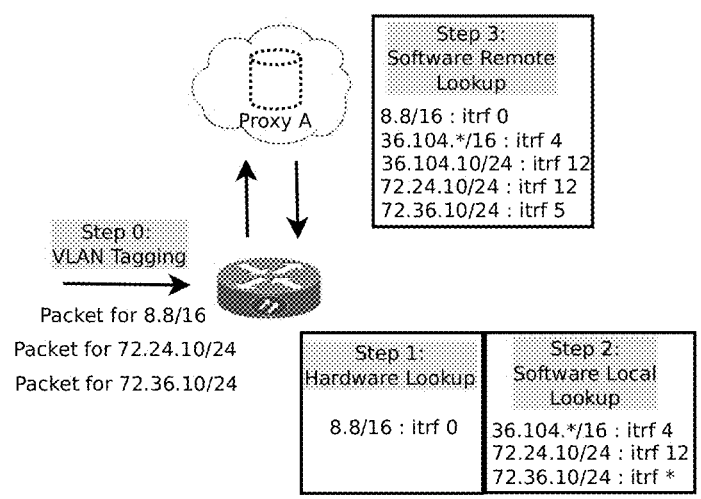
FIG. 4 is a schematic diagram of a proxy router-assisted routing, such as a cloud assisted routing, forwarding table lookup scenario.

In some implementations of the present disclosure, only partial FIB is stored at the router hardware and packets are delegated to the cloud if a miss occurs during the lookup at the partial FIB. The proxy at the cloud stores the full FIB, and thus will be able to handle any misses at the router hardware. As shown in FIG. 4, this relationship between the hardware router and the proxy at the cloud can be implemented via tunnels or dedicated TCP sessions.

CAR handles FIB lookups in a hierarchical memory organization, as shown in FIG. 4. For instance, some packets will be handled completely via hardware lookups (e.g., packets destined to 8.8/16 in the figure), some via software lookups at the router (e.g., packets destined to 72.24.10/24 in the figure), and some via lookups at the cloud (e.g., packets destined to 72.36.10/24 in the figure).

Similar to traditional cache organizations, the lookup will be delegated to one level up in the hierarchy if a miss occurs. However, unlike the traditional cache systems, the level below will store entries corresponding to an aggregate of multiple entries at the level above if the real entries are to be stored at the level up. For example, if an entry is placed under the prefix 72.36.10/24 to the cloud, then all other entries under that pre-fix will be moved to the cloud as well. Though holes could be punched and some "important" entries could be placed at the router, motivation for such complication, may not always be that great—particularly when the delay to the closest cloud can be pretty short in the Internet.

In general, the placement of prefix entries to the different levels of this CAR framework involves several dynamic parameters such as lookup frequency of prefixes and importance of prefixes due to their contractual value. The positive factor is that high locality patterns exist in these parameters. Those prefixes that are delegated to the cloud will suffer from additional delays, and a key goal will be to establish an acceptable fairness across prefixes. Heuristics can be developed that can adapt to these dynamics and reorganize the FIB placement in CAR so that the locality can be leveraged to the extent possible while keeping an overall fairness across flows.

The Internet's routing has grown to be a complex, customizable service which may be difficult to manage using routers alone. The concept of "Routing As a Service" (RaaS) implies the separation of control and data planes where routing decisions are made and executed. Such a separation can be beneficial where control plane tasks are delegated to "clouds," which offer the vast computational power, storage and parallelism need by the enlarging and diversifying routing problem. Path calculation with respect to multiple distance metrics (e.g., bandwidth, latency, loss rate, price) on a wide-range of possible IPv6 address space may be challenging on existing routers, with their typically limited capacities. Parallel router architectures, network processors, or GPU-empowered routers can mitigate this complexity temporarily. However, these approaches may not be suitable to prepare routers for the next billion of Internet users with more challenging application traffic requirements. The method of the present disclosure offers easily extendable capacity that addresses these challenges.

Routing tasks consume much of the resources on current routers. These operations are inherently compute-heavy tasks, which are usually not being computed in an online manner. Delegation of these computation- and memory-intensive operations to the cloud is a feature of the present disclosure. Classification of these tasks carried out by a router as "delegatable" or "in-place" aids in delegating some of them to a cloud-based control plane. Then, released resources by offloaded delegatable tasks can be reclaimed by data plane to offer enhanced in-place services. Location-based characteristics of these in-place (or in-situ) services such as security, traffic management and monitoring typically require them to be executed on routers instead of a remote location, e.g., the cloud. Along with the delegation of routing tasks and simplified architecture of routers, these network entities can be better designed to support virtualization and programmability.

Beyond bridging the gap between router hardware and software-based routing services, CAR allows an array of opportunities for improving ISP backbones such as (i) resiliency to failures via cloud-based forwarding and reroute schemes, (ii) efficiency via more centralized cloud-based optimizations of intra-domain traffic engineering, and (iii) economic competitiveness via cloud-based on-demand service provisioning potentially going beyond domain borders.

Figure 5:
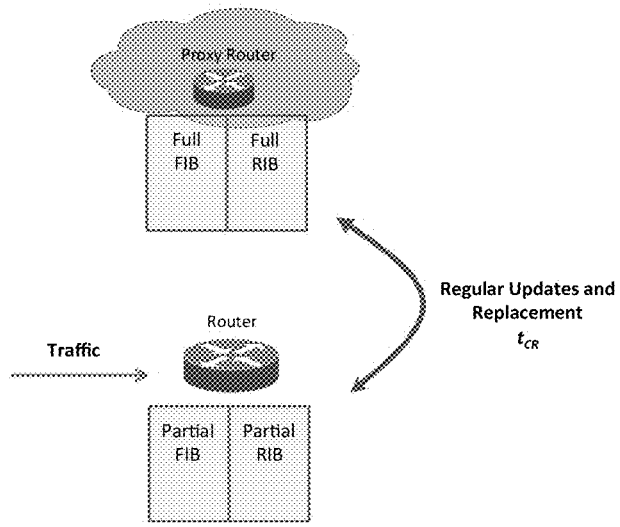
FIG. 5 is a schematic diagram illustrating functional placement for a proxy router according to an embodiment of the present disclosure

One technical challenge a CAR designer has to tackle is to place the routing functions appropriately. FIG. 5 shows the overall picture the designer faces. The full router functionality is to be placed in the Proxy Router located at the cloud. The key question is how much of the router functions should be kept available in the router so that the overall router performance experienced by the incoming traffic is acceptable. In general, placing some of the router function at a remote location like the cloud will degrade the performance. If this placement is done well, then it is possible to serve more than 95% of the traffic at the (hardware) router without having to bother with the Proxy Router at the cloud.

To-delegate or not-to-delegate. Due to the extra delay coming from delegation to the cloud, CAR designer's key metric to decide how to place or split functions to be delegated to the cloud is the cloud-router delay, $t_{CR}$. FIG. 5 illustrates one example of where the CAR may be functionally placed. The router hardware acts like a cache to the full router function located at the cloud. If is too high, the designer should no delegate to the cloud and keep more routing functions at the router to achieve higher overall efficiency. But, for a limited hardware router, other factors such as rates of traffic flows and router's buffer size will play a role in identifying which flows to delegate. CAR's contribution here is a framework for exploring efficiency-fairness tradeoff, potentially on a flow-based manner.

Adaptive tuning to exploit locality patterns in traffic. An indicator for fruitfulness of CAR is whether it is possible to achieve a similar performance with smaller router hardware resources, like memory. Just like the virtual memory does not pay off if there is no locality, it is preferable if CAR actively leverages the locality patterns in traffic to yield benefits over the existing router designs. This may involve adaptive tuning of caching and delegation of router's functions for different traffic patterns and situations. The benefit of CAR may depend to some extent on the effectiveness of this adaptive tuning. In some implementations, adaptive tuning takes into account the locality and regularity of the traffic patterns arriving at a router.

Figure 6:
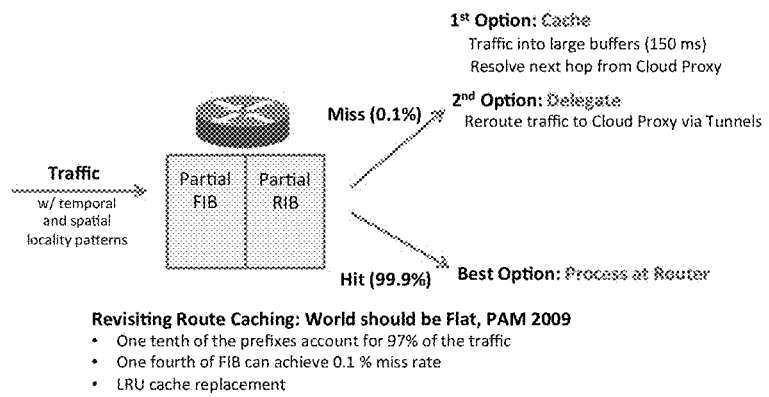
FIG. 6 is a schematic diagram illustrating an embodiment of potential routing or processing scenarios for incoming traffic according to the present disclosure.

FIG. 6 illustrates three different possibilities for incoming data traffic packet to a CAR Router. If the destination prefix of the data packet is available at the partial routing tables at the Router, then the packet will be processed at the router hardware. However, if the lookup at the partial tables is a miss, then the packet will either be cached or delegated to the Proxy Router at the cloud. If tCR is small (e.g., smaller than 50 ms) or the local buffer is too small to temporarily keep the packets of this (and potentially several other) flow(s), then may be best to delegate the packet the Proxy Router. But, if it is imminent that many more packets will arrive on this flow and that continuous delegation of it to the Proxy Router will make too many customer packets experience increased delay, it may be best to resolve the "miss" in a manner similar to page fault handling in virtual memory and process the traffic at the router. Implementation of router-cloud integration can involve analysis and determination of key parameters, such as tCR, buffer size at the Router, rate of the flow in question, cloud response time, and priority of the flow.

Establishing Robustness via Multi-Cloud Design. Migrating routing functions to the cloud can have risks, such as uncertainty of the cloud response times and hazy reliability to the cloud services in general. In some embodiments, the present disclosure incorporates array scenarios where a failure (or significant delay) may occur on the Proxy Router at the cloud. In further scenarios, the Proxy Router may serve as a backup for failures on the hardware Router or associated links.

Figure 7:
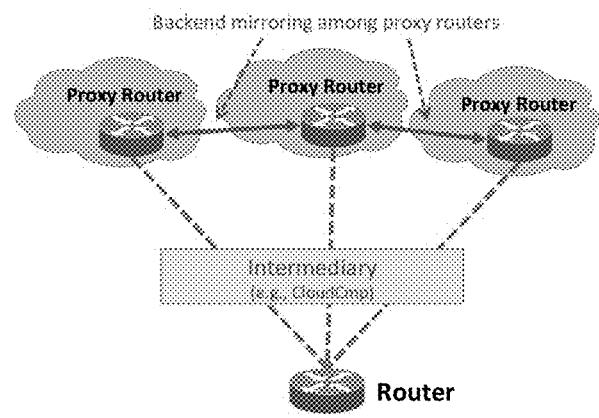
FIG. 7 is a schematic diagram of system according to an embodiment of the present disclosure using multiple proxy routers, such as cloud based proxy routers.

Picking the Best Cloud. It is possible to pick the best cloud provider for one's location for different application-desired metrics such as response time or service price. This can help systems and methods of the present disclosure using consideration of multiple clouds to establish reliability in the Proxy Router. As shown in FIG. 7 the Proxy Router can be mirrored at multiple cloud providers and the "best" one dynamically selected depending on time and the task at hand. An intermediary similar to CloudCmp can cope with variations in the cloud service quality. For example, when a packet is to be delegated to the Proxy Router, such an intermediary can balance various parameters, including the importance of the traffic flow the packet belongs to, closeness of the candidate clouds to the destination of the packet, and the service prices of the candidate clouds. This multi-cloud approach provides opportunities beyond failure management and allows various optimizations among the backend cloud providers depending the traffic characteristics—its destination or priority.

The intermediary can be implemented at the Router or a computer/server in proximity of the Router. In another example, this intermediary can be migrated to a cloud provider that is willing to provide certain performance assurances in response time, which of course could entail costlier cloud pricing. This type of multi-cloud framework may employ efficient mirroring of the Proxy Routers among the multiple clouds, which can be done with legacy standard protocols.

Figure 8:
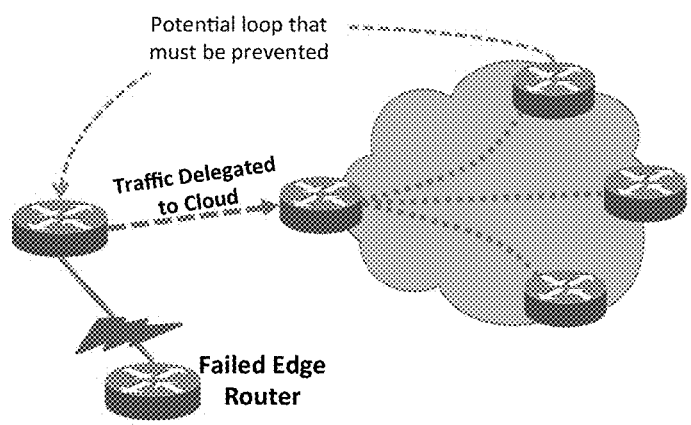
FIG. 8 is a schematic diagram of a system according to an embodiment of the present disclosure for rerouting traffic using proxy router-assisted routing, such as cloud based forwarding.

Failure-Triggered Traffic Delegation to the Proxy Router: In case of a major link failure, significant amount of traffic may be rerouted without deteriorating the service quality levels for the remainder of the network. The methods and systems of the present disclosure can be used to help with forwarding functions to help address failure issues, including use in redundancy/over-provisioning models and architectures to achieve greater network resilience. For example, upon a failure on a link to a neighbor router X, a CAR Router can forward/delegate the affected traffic (which would normally go to X) to the Proxy Router at the cloud—as shown in FIG. 8.

Such delegation could potentially be done in a manner seamless to other routers. However, potential inconsistencies should be considered and potentially reduced or prevented. For example, the Proxy Router should normally not be somehow forwarding the traffic back to the hardware Router. One simple way of assuring this does not happen is to maintain a separate lookup table at the cloud node where the Proxy Router is located and check if the Proxy Router is the next hop for the destination prefix in question. Consideration of policy issues may make this task more complicated; however, it will be possible to manage these complications by carefully organizing which prefixes are to be allowed for such failure-triggered traffic delegation.

Migration in CAR Routers: Another interesting aspect of the CAR architecture is to decouple lower layer of network configuration with the states of upper layers. This separation enables definitions of movable soft states which can define forwarding information for flow descriptors, service provisioning for differentiated services, security settings or even enhanced packet forwarding functions. Then, one perspective is that the CAR Router state is a mapping between these lower layer configurations with upper layer state. Currently, virtualization and tunneling technologies offer wide-range of flexibilities for achieving CAR architecture. Telecommunication vendors also have various consortiums for developing common standards and interfaces to enable such mechanisms. However, technologies such as virtualized service mirroring and migration, especially for virtual machines, are still typically bound to the limitations of both hardware, software and networking protocols such as:

How fast can a service be activated after a bootstrapping process while involving hardware components?

Although VLAN technologies achieve greater success, how fast can VLAN configurations be setup? What are the limitations for GRE tunnel establishment, MPLS label creation or speed of layer 2 learning mechanisms?

Even though load balancing can be achieved through DNS redirection updates, how frequent can these updates be?

Such decoupling can be used to achieve "movable states" of provisioned services or forwarding plane among virtualized hardware. This can become especially important for Virtual Network Operators (VNOs) switching infrastructure providers or for infrastructure owners to quickly recover after node failures. CAR architecture provides quick access to the cloud storage and computation capabilities to compute, store and retrieve these movable states. Legacy protocols and standards can be employed to achieve movable states via CAR routers.

Figure 9:
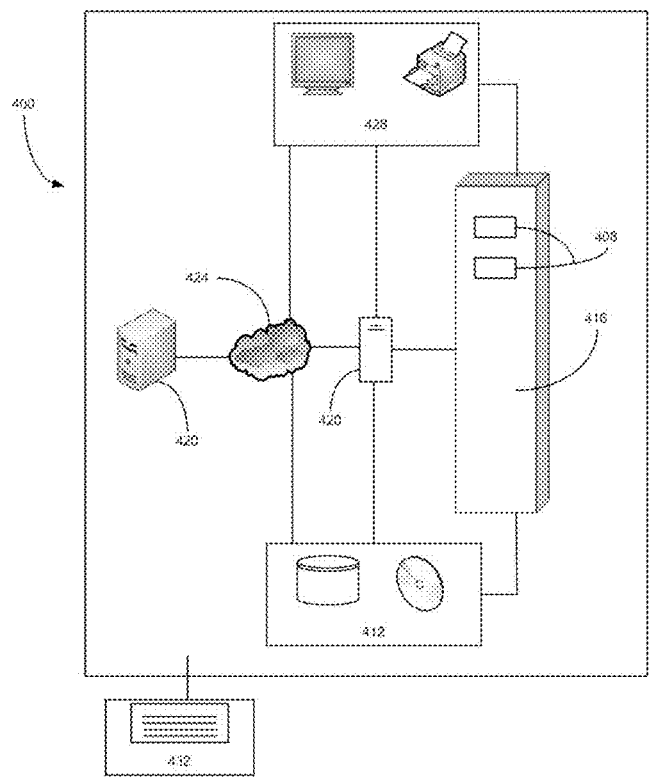
FIG. 9 is a schematic diagram of an operating environment useable with certain embodiments of the present disclosure.

FIG. 9 illustrates an embodiment of an operating environment 400 in which the method of the present disclosure can be performed. The operating environment 400 can be implemented in any suitable form, such as one or more desktop personal computers, laptops, workstations, dedicated hardware components, handheld devices, such as a tablet computers, smartphones, or PDAs, or in parallel, concurrent, distributed, or virtualized computing environments.

The method can be carried out by one or more program modules 408 such as programs, routines, objects, data structures, or objects. The program modules 408 may be stored in any suitable computer readable medium 412, including tangible computer readable media such as magnetic media, such as disk drives (including hard disks or floppy disks), optical media, such as compact disks or digital versatile disks, nonvolatile memory, such as ROM or EEPROM, including non volatile memory cards, such as flash drives or secure digital cards, volatile memory, such as RAM, and integrated circuits. The program modules may also be implemented in integrated circuits, such as application specific integrated circuits. The program modules 408 may be stored on the same computer readable medium 412 as data used in the method (such as a library of potential binding partners) or on different media 412.

The method can be executed by, for example, loading computer readable instructions from a computer readable medium 412 into volatile memory 416, such as RAM. In other examples, the instructions are called from nonvolatile memory, such as ROM or EEPROM. The instructions are transmitted to a processor 420. Suitable processors include consumer processors available from Intel Corporation, such as PENTIUM(™) processors and the CORE(™) series of processors, or Advanced Micro Devices, Inc., as well as processors used in workstations, such as those available from Silicon Graphics, Inc., including XEON(™) processors or portable devices, such ARM processors available from ARM Holdings, plc. Although illustrated as a single processor 420, the processor 420 can include multiple components, such as parallel processor arrangements or distributed computing environments. The processor 420 is located proximate the computer readable medium 412, in some examples. In other examples, the processor 420 is located remote from the computer readable medium 412 and information may be transmitted between these computers over a data connection 424, such as a network connection.

Output produced by the processor 420 may be stored in computer readable media 412 and/or displayed on a user interface device 428, such as a monitor, touch screen, or a printer. In some examples, the processor 420 is proximate the user interface device 428. In other examples, the user interface device 428 is located remotely from the processor and is in communication with the processor over a data connection 424, such as a network connection.

A user may interact with the method and operating environment 400 using a suitable user input device 432. Suitable user input devices include, for example, keyboards, pointing devices, such as trackballs, mice, electronic pens/tablets, and joysticks, touch screens, and microphones.

EXAMPLE

CPU Burst for BGP Peering

BGP peer establishment (PE) is a CPU-intensive process which can leverage CAR, which exploits cloud-services for performance gain without introducing a hard-dependency on cloud-availability. The PE process requires full-table exchange among neighbors, and best-path selection algorithm is applied on received routes for each prefix entry during the process. Considering the RIB table size of a default-free zone (DFZ) router (≈400K) and the PE between DFZ routers, path-selection process produces a small subset of routes as primary paths from peer while installing remaining routes as backup paths. In fact, for representative BGP table dumps from RIPE route servers, even peering among routers at distant locations results in selection of 2.5% or less of advertised routes as best paths.

To improve the amount of traffic and CPU usage during the PE process, there are schemes, which allow a peer to dynamically express its interest on advertisements of specific prefixes instead of full-table exchange without introducing significant convergence delays. Suitable schemes are described in Karpilovsky, et al., "Using forgetful routing to control BGP table size," Proc. of ACM CoNEXT, 2006, pp. 2: 1-2:12 and Chen, et al., "Outbound route filtering capability for BGP-4," RFC 5291, August 2008. These mechanisms are particularly useful for enterprise network scenarios where border gateways may be interested in routes for a few prefixes due to their policies while accepting default route from its provider for the rest. In case of DFZ routers, though, it is not known a-priori which paths to be selected as primary routes during PE.

Figure 10:
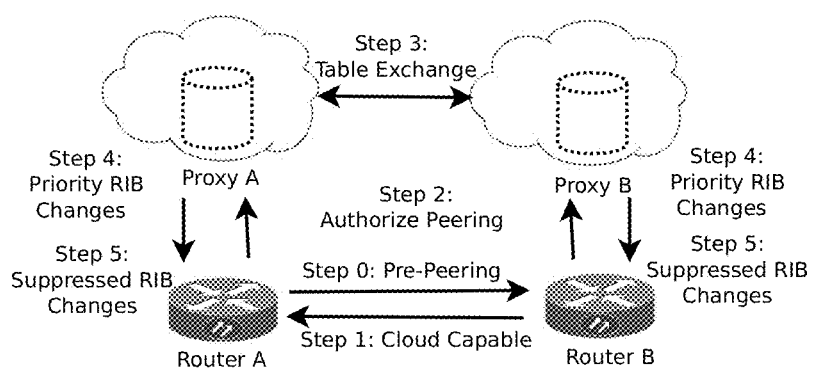
FIG. 10 is a schematic diagram illustrating a peer establishment scenario according to an embodiment of the present disclosure.

Building upon this observation, a two-phase PE mechanism is provided which can exploit computational and storage resources of the cloud. As seen in FIG. 10, prior to PE, during the capability exchange phase, routers inform their peers if they are CAR-capable by exchanging the address of their proxies at the cloud(s). Second step is the authorization of PE between the proxy routers, which keep exact copies of the routing and forwarding state of actual routers and will carry out tasks related to full table exchange and BGP route selection processes.

Upon completion of these processes, the proxy routers will classify the changes on routing and forwarding states as 'priority' and 'non-priority'. So, if the selection of a route leads to forwarding-path changes, this entry will be marked as priority. Only routes marked as priority will be exchanged between the actual routers, filtering out all other entries for the first phase of the PE. Consequently, the actual router only has to consume its computational resources on significant updates while suppressing updates related to backup paths for a later phase (or eliminating all together relying on explicit route-refresh mechanisms). Such a scheme can i) significantly shorten the amount of time required for PE via BGP parallelization mechanisms running at the cloud, ii) reduce the CPU bursts on peering routers, and iii) reduce BGP control traffic.

Figures 11, 12:
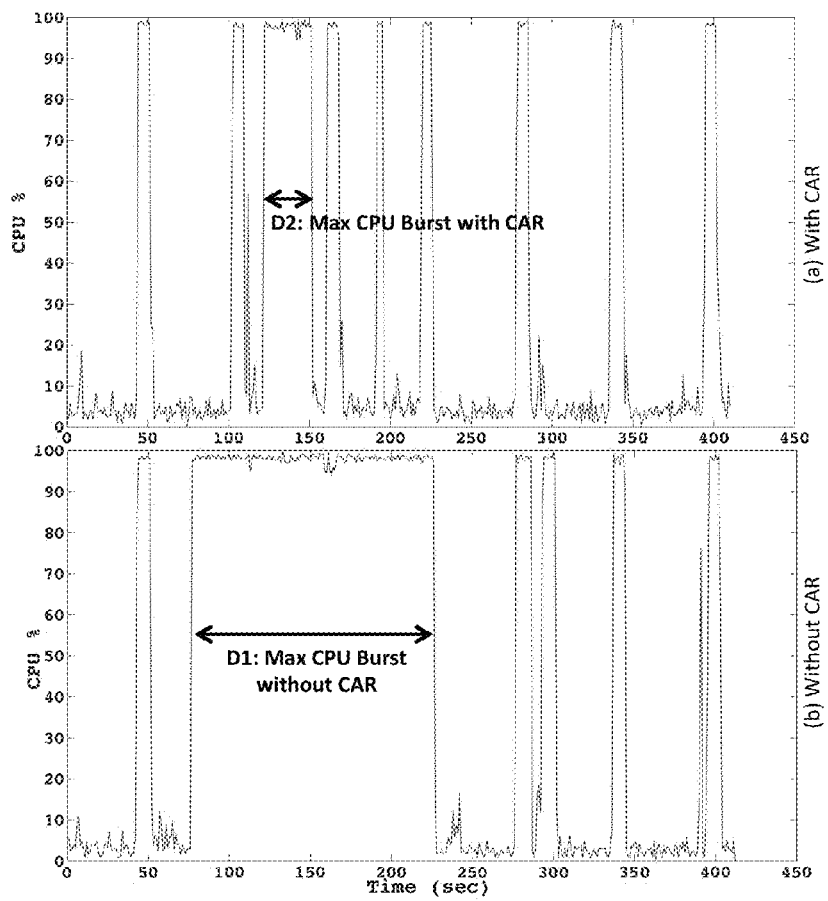
FIG. 11 is a table summarizing traffic parameters and CPU burst durations for three datasets used in an example according to an embodiment of the present disclosure.
FIG. 12 is graphs of CPU usage (percent) versus time (seconds) illustrating CPU bursts of DECIX Peering LINX for routing with and without cloud assisted routing.

A simple prototype of BGP PE process with CAR was developed in the Emulab testbed. In a dumbbell topology setting, using route injectors as peers whose total numbers given in Table 1 (FIG. 11), routes were advertised to two Quagga routers running on Dell 2850 servers with Intel Dual Core 3 GHz processors and 2 GB DDR2 SDRAM. These route injectors also generate traffic and replay BGP update messages at constant rates, also given in Table 1 (FIG. 11). For three separate BGP peer router pairs, BGP table and update message dumps from RIPE and Routeviews were gathered for the day of Nov. 8, 2011. Aggregated IPv4 bogon filters from the same resources were used as inbound prefix filters.

Once the route injectors advertise their full RIB, a peering between the two Quagga routers was initiated and CPU utilization records on them collected. Finally, matching BGP logs and the CPU records, the duration between PE initiation and the time BGP reaches its convergence state was calculated. To emulate the steps 4 and 5 of the disclosed CAR PE process, an Expect script was developed that downloads a pre-calculated prefix-list generated by the proxy router of the peer and installs this prefix-list as outbound filter for eliminating all the routes except the ones selected as best paths (i.e., 'priority') by its peer. Then, the actual PE is initiated and the duration of CPU bursts calculated. This example PE process was repeated three times for each BGP router pair. For the three BGP router pairs, the average of the three maximum CPU bursts with (D2) or without (D1) CAR are reported in Table 1 (FIG. 10).

In FIG. 12 CPU utilization gathered for setup with and without CAR comparatively for the LINX-DECIX BGP router pair is plotted. The large CPU bursts are due to BGP Router Thread, which is responsible for processing updates whereas short, periodic CPU burst are generated by BGP Scanner Thread. To ensure short convergence times, BGP Router Thread is given all the free cycles available, which may cause CPU utilization bursts for several minutes. As can be seen in FIG. 5 and Table 1, CAR can significantly reduce these CPU bursts, which may cause unresponsive state for other routing proto-cols running on the router hardware as well as packets requiring optional forwarding. Because of the Emulab environment and RIPE datasets, this Example had small traffic rates for each interface (below 1 GB/sec), small route-to-prefix ratio (≈1.82), and limited inbound-outbound filtering. In actual use on the Internet, the CPU load on a BGP router is much higher, and thus, the benefit of CAR more pronounced.

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

What is claimed is:

1. A computer implemented method of routing information, comprising:

receiving a first routing information base at a cloud based software proxy router with full routing functions and capabilities, wherein the cloud based software proxy router comprises a full forwarding table and full control plane functionality in which packet classification, and wherein flow descriptions and corresponding forwarding actions are defined as movable states and computed by a control plane;

comparing, at the cloud based software proxy router, the first routing information base to a second routing information base associated with an assisted router, wherein the assisted router is a hardware router with partial routing functions and capabilities, wherein the hardware router comprises a partial forwarding table and partial control plane functionality and maps ghost configurations to lower level networking resources and the cloud based software proxy router and hardware router appear as a single router to the rest of the network;

updating, at the cloud based software proxy router, the second routing information base based on the comparing; and transmitting, by the cloud based software proxy router, the updated second routing information base to the assisted router, wherein packets are delegated to the cloud based software proxy router when a miss occurs at the assisted router via generic routing encapsulation tunnels or a virtual local area network.

2. The method of claim 1, wherein transmitting the updated second routing information base to the assisted router consists of transmitting priority changes in routing and forwarding states to the assisted router at a first time.

3. The method of claim 1, wherein transmitting the updated second routing information base to the assisted router consists of transmitting nonpriority changes in routing and forwarding states to the assisted router at a first time and at a second time.

4. The method of claim 3, wherein the second time is triggered by a request from the assisted router.

5. The method of claim 1, wherein transmitting the updated second routing information base to the assisted router comprises transmitting priority changes in routing and forwarding states to the assisted router at a first time.

6. The method of claim 5, wherein transmitting the updated second routing information base to the assisted router comprises transmitting nonpriority changes in routing and forwarding states to the assisted router at a second time.

7. The method of claim 6, wherein the second time is triggered by a request from the assisted router.

8. The method of claim 1, wherein the assisted router is a first assisted router, further comprising:

receiving at the first assisted router a capability exchange request from a second assisted router;

transmitting to the second assisted router that the first assisted router is associated with the cloud based software proxy router;

at the cloud based software proxy router, receiving a request associated with the second assisted router to exchange routing information associated with the first assisted router.

9. The method of claim 1, wherein the assisted router is a first assisted router, further comprising, at the cloud based software proxy router, receiving a request associated with a second assisted router to exchange routing information associated with the first assisted router.

10. The method of claim 1, wherein the assisted router is a first assisted router and the cloud based software proxy router provides routing assistance to a second assisted router, comparing the first routing information base to a third routing information base associated with the second assisted router.

11. The method of claim 1, wherein the assisted router is a first assisted router and the cloud based software proxy router provides routing assistance to a plurality of assisted routers, further comprising, for each of at least a portion of the plurality of assisted routers, comparing the first routing information base to a routing information base associated with that assisted router.

12. A computer implemented method of routing information, comprising:

at a cloud based software proxy router with full data plane and full control plane functionality, providing routing assistance to a hardware router with partial data plane and/or partial control plane functionality, wherein the cloud based proxy router and hardware router appear as a single router to the rest of the network and are placed in different business entities or autonomous systems, and wherein packet classification, flow descriptions and corresponding forwarding actions are defined as movable states and computed by a control plane at the cloud based software proxy router while mapping ghost configurations to lower level networking resources occurs at the hardware router, performing partial control plane computations for routing information associated with the hardware router; and transmitting updated routing information with full control plane computations from the cloud based software proxy router to the hardware router, wherein packets are delegated to the cloud based software proxy router when a miss occurs at the hardware router via generic routing encapsulation tunnels or a virtual local area network.

13. The method of claim 12, wherein transmitting the updated routing information to the hardware router consists of transmitting priority changes in routing and forwarding states to the hardware router at a first time.

14. The method of claim 12, wherein transmitting the updated routing information to the hardware router consists of transmitting nonpriority changes in routing and forwarding states to the hardware router at a first time and at a second time.

15. The method of claim 14, wherein the second time is triggered by a request from the hardware router.

16. The method of claim 12, wherein transmitting the updated routing information to the hardware router comprises transmitting priority changes in routing and forwarding states to the hardware router at a first time.

17. The method of claim 16, wherein transmitting the updated routing information to the hardware router comprises transmitting nonpriority changes in routing and forwarding states to the hardware router at a second time.

18. The method of claim 17, wherein the second time is triggered by a request from the hardware router.

\* \* \* \* \*